Aug. 23, 1966     A. C. ROMANO ETAL     3,267,835
AUTOMATIC BROILER

Filed March 23, 1965     3 Sheets-Sheet 1

INVENTORS.
ANGELO C. ROMANO
GEORGE E. BERGEY
BY

ATTORNEY

Aug. 23, 1966  A. C. ROMANO ET AL  3,267,835
AUTOMATIC BROILER

Filed March 23, 1965  3 Sheets-Sheet 2

INVENTORS
ANGELO C. ROMANO
GEORGE E. BERGEY
BY
ATTORNEY

United States Patent Office 3,267,835
Patented August 23, 1966

3,267,835
AUTOMATIC BROILER
Angelo C. Romano, 423 Jefferson Drive, Southampton, Pa., and George E. Bergey, 220 Cedar Ave., Horsham, Pa.
Filed Mar. 23, 1965, Ser. No. 442,096
17 Claims. (Cl. 99—334)

This invention relates to automatic broilers.

It has heretofore been proposed to provide broilers for food in which the heat was applied for selected time periods. Variations in weight, thickness, grade, moisture content and the like, particularly of meat, result in lack of uniformity in the finished product.

It is the principal object of the present invention to provide an automatic broiler with which a close control of the cooking is obtained so that a high degree of uniformity of product is effected, and in which the heat is simultaneously applied to both sides of the articles to be broiled.

It is a further object of the present invention to provide an automatic broiler for simultaneously broiling a plurality of pieces of meat, with the cooking controlled by the internal temperature of the meat.

It is a further object of the present invention to provide an automatic broiler for meat in which the meat to be cooked is mounted on racks, each piece of meat having a temperature sensing device inserted therein with variable condition selector controls actuated by each sensing device, the meat is exposed to the source of heat, and when the desired preselected internal temperature of each piece of meat is attained that piece is discharged from the rack and delivered to a delivery location.

It is a further object of the present invention to provide simple but effective automatic broiling apparatus with which a plurality of pieces of meat can each be broiled to the desired extent independently of the others, and upon completion of the broiling is removed and delivered for use.

It is a further object of the present invention to provide an automatic broiler which is compact, easy to keep in clean condition, and which is ready for use when desired without any extended waiting period.

It is a further object of the present invention to provide automatic broiling apparatus in which the broiling is effected in a closed compartment which is provided with a drawer having meat holding racks, the movement of the drawer being employed to position the racks to receive the meat for broiling and to position the racks with meat carried thereon with respect to the heat sources for broiling.

Other objects and advantageous features of the invention will be apparent from the description and claims.

The nature and characteristic features of the invention will be more readily understood from the following description, taken in connection with the accompanying drawings forming part thereof, in which.

Figure 1:
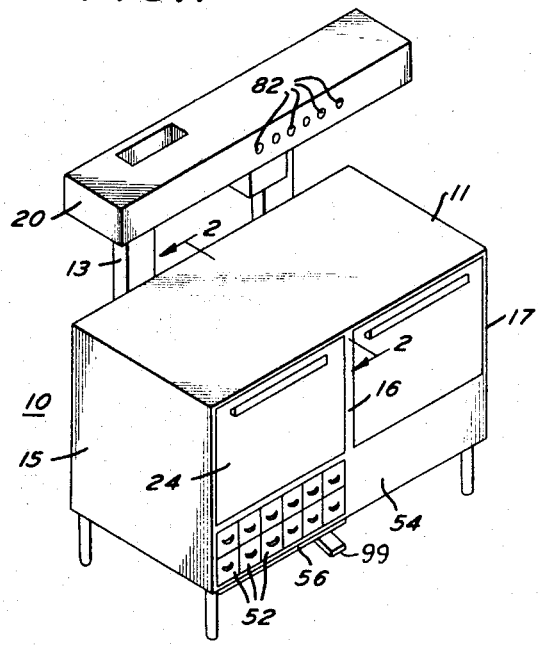
FIGURE 1 is a view in perspective of an automatic broiler in accordance with the invention and with the drawer in closed condition for broiling.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a cabinet 10 is provided within which the apparatus of the present invention is housed or carried as required. The cabinet 10 includes a horizontal top wall 11, a vertical rear wall 12, exhaust ducts 13 communicating through openings 14 in the rear wall 12, and with a chimney (not shown), spaced vertical walls 15, 16 and 17, and a horizontal bottom wall 18. The space between the walls 16 and 17 can be employed for storage, if desired, or for other purposes, including different cooking units.

A control housing 20 can be carried by the exhaust ducts 13.

The walls 11, 12, 15, 16 and 18 can be insulated in any desired manner to reduce heat transmission to the exterior of the cabinet 10, if desired.

The walls 15 and 16, intermediate the top and bottom walls 12 and 18, each has a horizontal row of rollers 21 carried on stub shafts 22. The rollers 21 support drawer tracks 23 of channel shape which are secured at their front ends to a drawer front 24 of a drawer 25. The tracks 23, intermediate their ends, have hollow frame posts 27, rectangular in cross section, secured thereto, the posts 27 being connected at their upper ends by a horizontal channel shaped frame bar 28.

The posts 27 have a fixed shaft 30 extending therebetween on which racks 31 and 32 are pivotally mounted. The racks 31 and 32 are similar in construction with U-shaped outer frames 33, and parallel rack rods 34 secured at one set of ends to the frame 33 and at their other set of ends in alternate groups to sleeves 35 pivoted on the shaft 30.

The racks 31 and 32, at one side thereof, have links 36 pivotally connected thereto, the links 36 at their other ends being pivotally connected to a rod 37 which is slidable in slots 38 in one of the frame posts 27.

Figure 5:
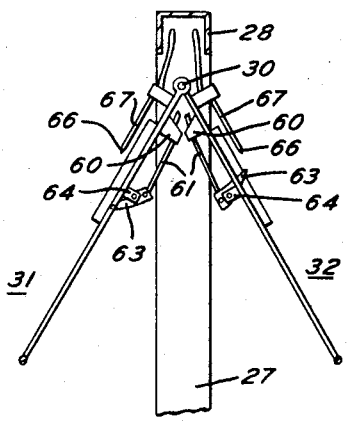
FIG. 5 is a fragmentary enlarged end elevational view of the racks and their mounting, on a larger scale to show the details of construction.
Figure 3:
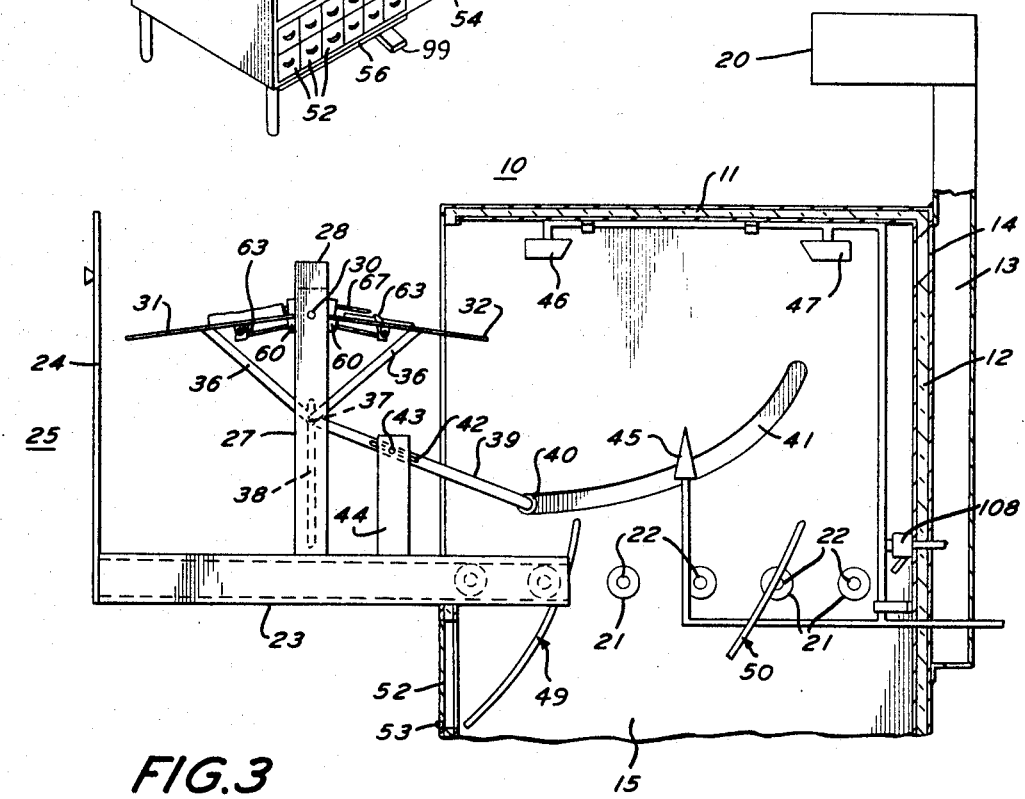
FIG. 3 is a view similar to FIG. 2 but with the drawer in open position for mounting of cuts of meat thereon.
Figure 2:
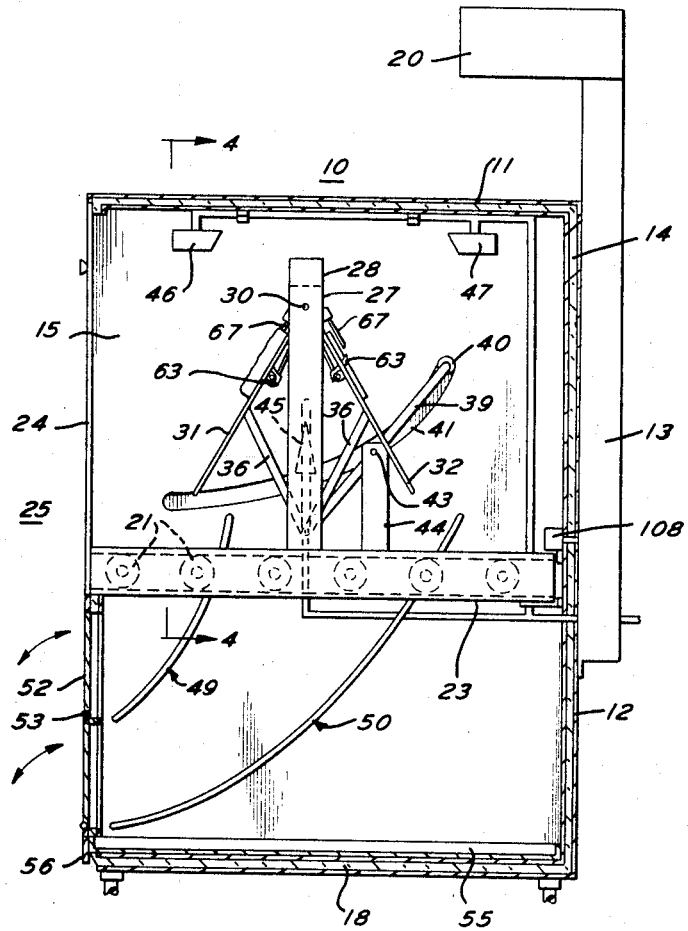
FIG. 2 is a vertical sectional view taken approximately on the line 2—2 of FIG. 1; and with the drawer in closed condition.
Figure 4:
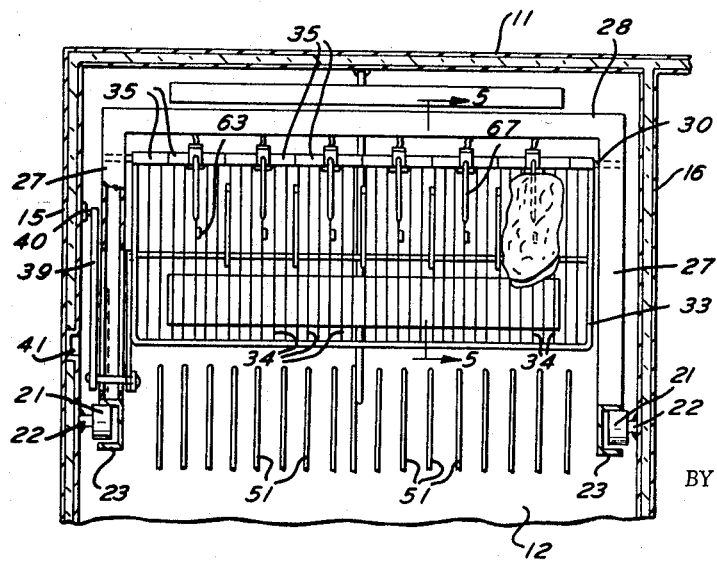
FIG. 4 is a vertical sectional view taken approximately on the line 4—4 of FIG. 2.

The rod 37 has one end of a cam follower arm 39 pivotally connected thereto, the other end of the cam follower arm 39 having a cam roller 40 mounted thereon and engaged in a cam track 41 in the wall 15. The cam follower arm 39 has a slot 42 for sliding engagement by a pin 43 carried on a post 44. The cam track 41 is shaped to cause the racks 31 and 32 to move, upon movement of the drawer tracks 23, from a downwardly tilted position for cooking, as shown in FIGS. 2 and 5, to an elevated and substantially horizontal position for loading, as shown in FIG. 3.

In order to provide the heat for broiling and so that the two sides of the meat on the racks 31 and 32 are simultaneously heated, a lower central heat source, 45 is provided at a location intermediate the top and bottom of the racks 31 and 32 when they are in lower position (see FIG. 2) and upper front and rear heat sources 46 and 47 are provided carried by the top wall 11.

The heat sources 45, 46 and 47 can be of any desired type, such as Schwank burners for gas, or conventional electric broiling coils.

The cabinet 10, in the interior thereof, is provided with a front delivery chute 49 and a rear delivery chute 50, made of spaced curved rods 51 which receive the pieces of meat after the completion of cooking and deliver the same for removal through access doors 52 mounted by hinges 53 on a lower front wall 54.

The bottom wall 18 preferably has a tray 55 thereon, removable through a tray access door 56, for collecting grease released during the broiling.

In order to retain the pieces of meat, such as steaks, on the racks 31 and 32, and impel the same for removal, for each piece of meat a solenoid 60 is provided having an armature 61 connected to a pointed arm 63 pivotally mounted on a pivot pin 64 carried by one of the racks 31 and 32. The arm 63 extends into engagement with the piece of meat and normally prevents it from moving downwardly when the racks 31 and 32 are in tilted positions but upon swinging to an out of engagement position withdraws its support and provides an impulse to urge the piece of meat to slide down the respective rack 31 or 32 and onto one of the delivery chutes 50 or 51.

Figure 6:
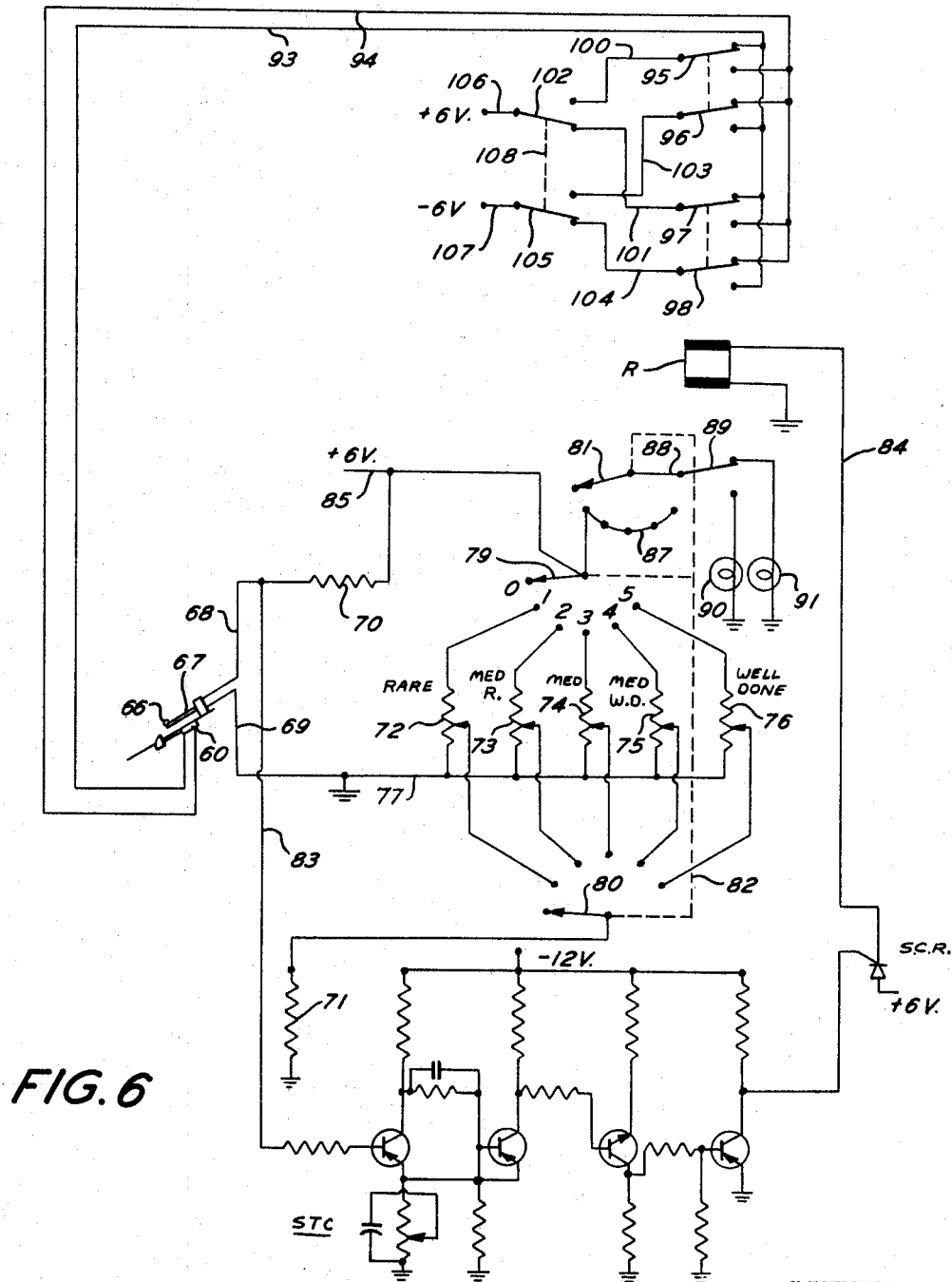
FIG. 6 is a diagrammatic view of one suitable arrangement of sensing and control circuits for use in connection with the invention.

One form of control circuitry is shown in FIG. 6.

For each solenoid 60 a bead type thermistor 66 is provided, mounted at one end of a slim hollow stainless steel needle 67 for insertion into each piece of meat whose internal temperature is to be measured to control the broiling thereof. The thermistor 66 has leads 68 and 69 and forms one leg of a Wheatstone bridge. The lead 68 is connected in series with a fixed resistance 70. A resistance 71, connected to ground is provided, and adjustable selective setting resistances 72, 73, 74, 75 and 76 are provided for interconnection between the resistances 70 and 71 to complete the bridge and with a connection 77 to ground, and to the lead 69.

The selective setting resistances 72, 73, 74, 75 and 76 are of predetermined variable values and are set to correspond to desired cooked condition of the meat to "rare," "medium rare," "medium," "medium well done" and "well done," with an additional "off" position.

The selection of the particular setting resistance is determined by a manually operable selector switch 82 which has selector arms 79, 80 and 81 movable together. The arms 79 and 80 connect the desired setting resistance into the bridge.

A Schmitt trigger circuit STC is provided, connected to the bridge by a conductor 83. The Schmitt trigger circuit STC is one suitable circuit for producing a positive one pulse output when the input voltage exceeds a predetermined level.

The Schmitt trigger circuit STC is connected by a conductor 84 to a silicon controlled rectifier SCR and thence to one terminal of the winding of the solenoid of a relay R, the other terminal being connected to ground.

The bridge has an input connection 85 between the resistance 70 and the selector arm 79.

The selector arm 81, movable with the arms 79 and 80 and contacting a contact bar 87, is connected by a conductor 88 to an armature 89 of the relay R. The armature 89 is movable to a position to energize a visual indicator 90, such as a lamp, to indicate that broiling is in progress or to a position to energize a visual indicator 91, such as a lamp, to indicate completion of the broiling and availability of the meat for serving.

The winding of the solenoid 60 has conductors 93 and 94 connected thereto, the energization of which is controlled by pairs of armatures 95 and 96, which are movable together and are positioned by the solenoid of the relay R, and contact arms 97 and 98 which are movable together and are positioned manually as by a foot pedal 99.

The armature 95 has a conductor 100 connected thereto and the armature 97 has a conductor 101 connected thereto the energization thereof being controlled by the contact arm 102 of a drawer operated switch 108.

The armature 96 has a conductor 103 connected thereto and the armature 98 has a conductor 104 connected thereto, the energization thereof being controlled by a contact arm 105 movable with the contact arm 102.

The contact arm 102 is connected by a conductor 106 to a positive source of potential and the contact arm 105 is connected by a conductor 107 to a negative source of potential thus permitting reversal of polarity upon movement of the drawer 24 from one to the other of its positions with respect to the drawer switch 108.

The mode of operation will now be pointed out.

The selector switches 82 are set to the desired levels of cooking desired.

Assume that heat sources 45, 46 and 47 are in heat supplying condition and that the drawer 25 is in open position with the racks 31 and 32 in their elevated position.

The pieces of meat to be cooked are mounted on the racks 31 and 32 with the thermistor needles 67 inserted into the interior of the meat.

With the drawer 25 in open condition energizing circuits for the solenoids 60 can be set up through the contact arm 105 and by operation of the contact arms 97 and 98 to provide either energization or deenergization as desired.

Upon closing of the drawer 25, the cam track 41 guides the cam roller 40, and through the cam follower arm 39, the rod 37 and the links 36, the racks 31 and 32 are moved downwardly to their lowered positions as seen in FIG. 2.

As the drawer 25 is closed, operation of the switch 108 provides for continuance of energization of the solenoids 60.

The heat applied on both sides of the meat on the racks 31 and 32 causes the internal temperature of the meat to rise, as cooking is effected. During the cooking operation, the resistance of the selected resistance 72, 73, 74, 75 or 76 is effective in the bridge to determine the input to the trigger circuit STC and when the desired input is attained an impulse is delivered to the conductor and to the silicon controlled rectifier SCR to energize the winding of the relay R. Upon such energization the armatures 95 and 96 are moved to their closed circuit position to energize the solenoids 60 in the direction to impel the arms 63 to their nonholding and discharge positions. The respective pieces of meat previously held for cooking are impelled downwardly along the racks 31 and/or 32 and slide down the respective delivery chutes 49 and 50 for removal through the doors 52.

Upon the completion of the cooking the drawer 25 can be drawn outwardly to open position and the racks 31 and 32 reloaded.

At any time prior to completion of the cooking operation, and subject to control by the switch 108 of the energization of the solenoids 60, the drawer 25 can be opened and the contents inspected.

The adjustment of the selector switches 82 permits of selection of cooking to suit the desires of the user.

It will thus be seen that suitable apparatus has been provided for carrying out the objects of the invention.

We claim:

1. Automatic broiling apparatus comprising
   an enclosing cabinet,
   heating elements in said cabinet,
   a support movable into and out of said cabinet,
   a meat supporting rack carried by said support,
   a meat engaging member movable with said rack for engaging meat supported on said rack,
   a temperature sensing element for engagement with meat on said rack,
   and members controlled by said temperature sensing element controlling said meat engaging member and moving said meat engaging member to a disengaged position.

2. Automatic broiling apparatus as defined in claim 1 in which
   said support has an additional meat supporting rack carried thereby, and
   said racks have connections for movement together.

3. Automatic broiling apparatus as defined in claim 2 in which
   said cabinet has a position controlling member therein, and
   said support has a position controlling member engaging with said other controlling member to change the 4. Automatic broiling apparatus as defined in claim 2 in which
said heating elements include upper and lower heating elements,
said support includes a slidably mounted horizontally movable drawer,
said drawer has uprights for supporting said rack, and
said cabinet and said drawer have interengaging members moving said racks from an elevated position to a position intermediate said heating elements for exposure of heat on said racks to simultaneous heating from opposite sides thereof.

5. Automatic broiling apparatus as defined in claim 1 in which
said cabinet has a delivery chute therein below said rack for receiving meat for said rack, and
said meat engaging member is movable for discharge of meat from said rack onto said delivery chute.

6. Automatic broiling apparatus as defined in claim 1 in which
said last members include portions for selective response to meat temperature to determine the cooked condition of the meat.

7. Automatic broiling apparatus as defined in claim 1 in which
a support position control member is provided for controlling said meat engaging member.

8. Automatic broiling apparatus as defined in claim 7 in which
an additional manually operable control member is provided for said meat engaging member operable independently of the position of said support with respect to the cabinet.

9. Automatic broiling apparatus as defined in claim 1 in which
said temperature sensing element includes an elongated tubular needle for insertion into the interior of the meat.

10. Automatic broiling apparatus as defined in claim 1 in which
said support includes a slidably mounted horizontally movable drawer.

11. Automatic broiling apparatus as defined in claim 10 in which
said drawer has uprights for supporting said rack, and
said cabinet and said drawer have interengaging members moving said rack from an elevated position to an inclined position.

12. Automatic broiling apparatus comprising
an enclosing cabinet,
a lower central heating element,
upper heating elements at forward and rearward portions of said cabinet,
a support movable into and out of said cabinet,
a pair of meat supporting racks carried by said support and movable from elevated positions for loading to inclined positions for exposure of opposite sides of said racks to said heating elements,
interengaging members on said support and said cabinet for positioning said racks,
a temperature sensing element having a portion insertable into the interior of a piece of meat on said rack,
a plurality of meat holding members for engagement with pieces of meat on said racks for sustaining said pieces on said racks, and
control members controlled by said temperature sensing member for controlling said meat holding members.

13. Automatic broiling apparatus as defined in claim 12 in which
said interengaging members include a cam track in said cabinet and a follower connected to said racks.

14. Automatic broiling apparatus as defined in claim 12 in which
said meat holding members each includes an arm movable into a piece of meat in one position and out of engagement with said meat in another position.

15. Automatic broiling apparatus as defined in claim 14 in which
discharge guide members are provided onto which said meat is impelled upon movement of said holding members.

16. Automatic broiling apparatus as defined in claim 12 in which
said control members include portions for selective response to predetermined cooked condition of said meat.

17. Automatic broiling apparatus as defined in claim 12 in which
said control members include additional members manually operable for controlling said holding members.

References Cited by the Examiner

UNITED STATES PATENTS

| | | | |
|---|---|---|---|
| 1,776,475 | 9/1930 | Moss | 126—340 |
| 2,038,361 | 4/1936 | Hawes | 99—334 X |
| 2,820,130 | 1/1958 | Dadson | 99—421 |
| 2,945,767 | 7/1960 | Phelan et al. | 99—107 |

WALTER A. SCHEEL, *Primary Examiner.*